United States Patent [19]

Wagner

[11] Patent Number: 4,692,127
[45] Date of Patent: Sep. 8, 1987

[54] DEVICE FOR A FORCE TRANSMITTING CONNECTION BETWEEN TWO SHAFTS

[75] Inventor: Alois Wagner, Olching, Fed. Rep. of Germany

[73] Assignee: Hasler AG Bern, Bern, Switzerland

[21] Appl. No.: 792,038

[22] Filed: Oct. 28, 1985

[51] Int. Cl.$^4$ .................... F16D 3/16; F16D 3/06
[52] U.S. Cl. ........................ 464/119; 403/56; 464/153; 464/169
[58] Field of Search ............... 403/56, 114, 116, 145, 403/146; 464/112, 114, 115, 119, 120, 147, 153, 162, 169

[56] References Cited

U.S. PATENT DOCUMENTS

| | | | |
|---|---|---|---|
| 1,686,695 | 10/1928 | Heon | 464/120 |
| 2,598,780 | 6/1952 | Garnier | 464/147 |
| 2,708,888 | 5/1955 | Varney | 464/115 X |
| 4,065,941 | 1/1978 | Aoki | 464/119 X |
| 4,136,532 | 1/1979 | Okuda | 464/113 |
| 4,199,179 | 4/1980 | Curry | 403/56 X |
| 4,270,367 | 6/1981 | Santore | 464/169 |

FOREIGN PATENT DOCUMENTS

| | | | |
|---|---|---|---|
| 896731 | 9/1983 | Belgium . | |
| 13274 | 3/1911 | France | 464/120 |
| 866590 | 8/1941 | France | 464/115 |
| 1216414 | 4/1960 | France . | |
| 2015517 | 8/1969 | France . | |
| 59-9314 | 1/1984 | Japan | 464/147 |
| 687286 | 2/1953 | United Kingdom . | |

Primary Examiner—Daniel P. Stodola
Attorney, Agent, or Firm—Horst M. Kasper

[57] ABSTRACT

An intermediate shaft is provided which achieves a sliding connection between an outer part (17) and an inner part (18) inserted into the outer part. Two Cardan joints are formed of axial bores (22, 31). The joint heads (48, 49) are inserted into the axial bores (22, 31) and include grooves (53, 52) which are open on one side. Dog driver bolts (44, 45) engage the open grooves. A helical spring (19) tensions the intermediate shaft (15) between the joints.

8 Claims, 1 Drawing Figure

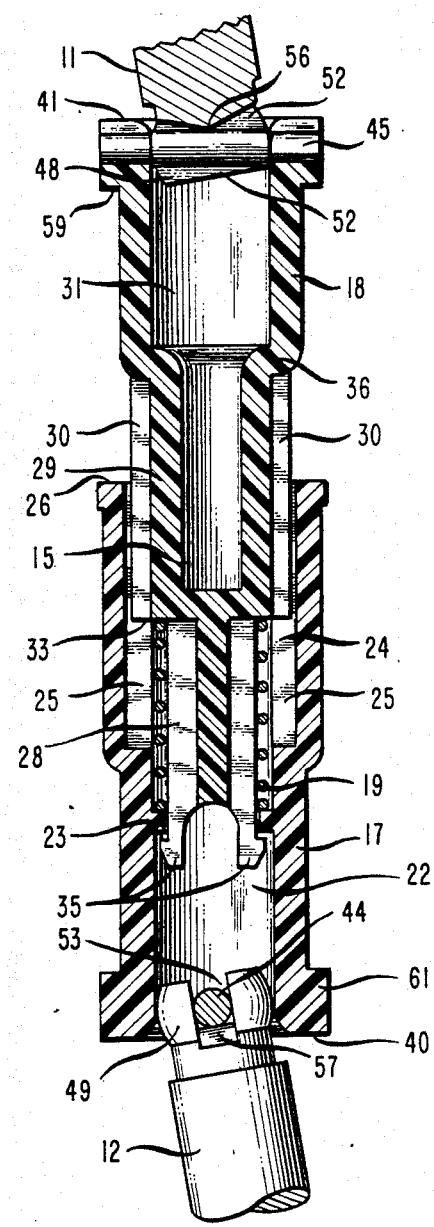

DEVICE FOR A FORCE TRANSMITTING CONNECTION BETWEEN TWO SHAFTS

BACKGROUND OF THE INVENTION

1. Field of the Invention

The invention relates to an apparatus for a force transmitting connection between a driving shaft and to a driven shaft where the axis of the driven shaft is not collinear to the axis of the driving shaft for forming a universal joint.

2. Brief Description of the Background of the Invention Including Prior Art

The U.S. Pat. No. 4,065,941 teaches a universal joint propeller shaft as an intermediate piece between a driving shaft and a driven shaft as a universal tool for example for a set of key wrenches. This universal joint propeller shaft comprises a tube wherein two ball shaped joints are supported in each case with a dog driver slot and a dog driver bolt for forming a Cardan joint or a Hooke joint. A helical spring disposed between the joints damps the jolts and thus reduces the wear. A second helical spring disposed on the outside between the tube and the driving shaft takes care of the automatic straight alignment of one joint in case of non-use of the universal joint propeller shaft.

It is further known for universal joint propeller shaft that they are provided with a sliding provision in order to balance a possible variation in distance between the shaft driving and the shaft driven.

SUMMARY OF THE INVENTION

1. Purposes of the Invention

It is an object of the present invention to provide a universal joint propeller shaft like device which allows the force transmitting connection of two shafts which are not aligned, where this device is very economical and simple.

It is a further object of the present invention to provide a universal joint which can be made from plastic materials.

It is another object of the present invention to provide a universal joint which can be assembled in a simple fashion.

These and other objects and advantages of the present invention will become evident from the description which follows.

2. Brief Description of the Invention

The present invention provides a device for a universal coupling of two non-collinear axles. A driving shaft has an axis and a driven shaft has an axis, which axes are not collinear relative to each other. Ball-shaped joint heads are rigidly attached to a respective end of the driving shaft and of the driven shaft and include dog driver slots, where the dog driver slots are formed as grooves which are open on one side. An intermediate shaft is disposed between the ball-shaped joint heads at the ends of the shafts with the intermediate shaft including an axial cylindrical bore for insertion of a respective ball-shaped joint head. The intermediate coupling shaft is formed as a sliding connection with a bushing shaped outer part and an inner part disposed in the outer part and where the intermediate shaft is placed onto the joint heads with its axial bores. A dog driver bolt is furnished for each joint head, where the dog driver bolt is anchored at the intermediate shaft and passes through a respective dog driver slot and where the dog driver bolts are placed in the grooves. A helical compression spring is disposed between the inner part and the outer part for maintaining these parts as disengaged as possible by exerting a pressure onto the inner part and onto the outer part such that the dog driver bolts are continuously disposed close to the centered protrusions in the floors of the grooves.

The outer part and the inner part in each case can be injection molded plastic elements. The outer part and the inner part in each case are provided with an axial bore for the joints. A slot can be applied on the driving shaft an on the driven shaft each to be placed in the region of these bores open relative to the front faces of the inner and outer parts, which slots are disposed radially opposite and which slots expand inwardly. The dog driver bolts can correspond in their length to the outer diameter of the outer part and respectively to the outer diameter of the inner part. The dog driver bolts can be thickened in their middle region over a length, which corresponds to the diameter of the axial bores. The regions not thickened of the dog driver bolts can be tuned in their diameter to the width of the recited slots and are snapped into the same.

The inner part can be provided with an extension. The extension can carry at its end springing support levers. The outer part csn be provided with a narrower inner collar section. The inner part is slid with its extension through the narrowing inner collar section of the outer part such that the helical spring is compressed in part and the inner part is maintained without possibility of disengagement in the outer part by the support lever.

The joint heads and the grooves disposed in the joint heads can form an integrated part of the driving shaft or, respectively, of the driven shaft. The joint heads and the grooves disposed in them can be provided as self-contained elements, which are rigidly connected to the driving or, respectively, driven shaft. The outer diameter of the extension of the inner part can have a diameter of a size of to about the inner diameter of the tubular section of the inner part plus minus 20 percent of the thickness of the wall of the tubular section.

The inner part and the outer part can be provided with an outer reinforcing collar at their ends meeting the driving shaft and, respectively the driven shaft. The spring can cover a longitudinal region of from about 10 to 40 percent of the total length of the outer part. An extension of the inner part can correspond in its length to about 30 to 50 percent of the total length of the outer part.

According to another aspect of the invention there is provided a method for joining two rotary non-collinear shafts in a power transmission. A ball head is provided with a slot on a driver shaft end. A ball head is provided with a slot on a driven shaft end. A double tube of two parts with an inner part sliding in an outer part and the two parts tensioned by a helical compression spring driving the two parts apart can be placed between the driver shaft end and the driven shaft end. The sections of the two sliding tubes adjoining the ends of the shafts are provided with dog follower bolts for engaging a respective slot in the respective shaft.

The inner part can be locked in the outer part with an extension of the inner part having support hooks being forced over an inner collar of the outer part for preventing a disengagement of the two parts.

The device can be produced very advantageously as an injection molded plastic part. The mounting does not require any tools, but can be done exclusively by hanging in of the driving and the driven shaft, which is also a very price advantageous feature. The device is effective in numerous applications. For example, in the case of office machines, it presents a useful mechanical device. It allows the balancing in a simple way of the lengths and the angles as well as a staggering between shafts.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which is shown one of the various possible embodiments of the present invention:

FIG. 1 is an in part sectional view of the universal joint according to the present invention.

DESCRIPTION OF INVENTION AND PREFERRED ENBODIMENT

In accordance with the present invention there is provided a universal coupling for connecting a drive shaft (11) with a driven shaft (12), which is not collinear in its axial direction relative to the axial direction of the drive shaft. The force transmission system comprises two ball type joints with an intermediate shaft (15) disposed between the drive shaft and the driven shaft, where each of the joints is formed by a ball-shaped joint head (48, 49), which is rigidly connected to one of the shafts (11, 12) and rotatably received by a cylindrical bore (31, 22) in the intermediate shaft (15) into which the joint head (48, 49) is inserted, a dog driver slot in the joint head, and a dog driver bolt (45, 44), which is anchored at the intermediate shaft (15) and which grips through the dog driver slot. A helical compression spring is disposed in the intermediate shaft (15) exerts a pressure on the joints.

In particular dog driver slots of the joint heads (48, 49) are provided as grooves (52, 53), which are open on one side. The intermediate shaft (15) is provided as a sliding connection with a bushing shaped outer part (17) and an inner part 17 inserted into the outer part. The intermediate shaft (15) with its axial bores (31, 22) is stuck onto the joint heads (48, 49) and is stuck into the grooves (52, 53) with the dog driver bolts (44, 45). The helical spring (19) exerts a pressure onto the inner (18) and the outer part (17) such that the dog driver bolts (45, 44) are closely contacting at centered protrusions (56, 57) in the bottoms of the grooves (52, 53).

The outer part (17) and the inner part (18) in each case can be injection molded plastic elements.

The outer part (17) and the inner part (18) in each case can be provided with an axial bore (22, 31) of the joints. Slots can be applied in the region of these bores (22,31) open relative to the front faces (40,41) of the parts (17, 18), which slots are disposed radially opposite and which slots expand inwardly. The dog driver bolts (45,44) correspond in their length to the outer diameter of the outer part (17) and respectively of the inner part (18). The dog driver bolts (44, 45) are thickened in their middle region over a length, which corresponds to the diameter of the axial bores (22, 31). The regions not thickened of the dog driver bolts (44, 45) are tuned in their diameter to the width of the recited slots and are snapped into the same.

The inner part (18) can be provided with an extension (28), which carries at its end springing support levers (35). The outer part (17) is provided with a narrower section (23). The inner part (18) is slid with its extension (28) through the narrowing inner collar section (23) of the outer part (17) such that the helical spring (19) is compressed in part and the inner part (18) is maintained without possibility of disengagement in the outer part (17) by the support lever (35).

The joint heads (48, 49) and the grooves (52, 53) disposed in the joint heads form an integrated part of tne driving (11) or, respectively, driven shaft (12).

The joint heads (48, 49) and the grooves (52, 53) disposed in them can be provided as self-contained elements, which are rigidly connected to the driving shaft (11) or, respectively, to the driven shaft (12).

Referring now to FIG. 1, there is illustrated a partially sectional side view of the device for a force transmitting connection between a driving shaft 11 and a driven shaft 12.

An intermediate shaft 15 is disposed between these staggered shafts 11 and 12. This intermediate shaft is composed of two injection molded plastic parts 17, 18 and a helical spring 19. The one plastic part 17, which is called in the following the outer part, forms substantially a tube which is formed in the outer region as an axial cylindrical bore 22, in the middle region as a narrowing inner collar 23 and in the inner region as an opening 24 with for example four longitudinal guide grooves 25. The radial amount of protrusion of the inner collar 23 can be from about 5 to 30 percent of the inner diameter of the outer part 17 and is preferably from about 10 to 20 percent of the inner diameter of the outer part 17. The length of the guide grooves 25 can be from about 20 to 80 percent of the total length of the male sliding part 17 and is preferably from about 40 to 60 percent of the total length of the male sliding part 17.

The other plastic part 18, which is called in the following the inner part is formed for insertion into the outer part 17. For this purpose, the inner part 18 is provided with an extension 28 of a cross-like cross-section, which is guided through the narrowing inner collar 23 of the outer part 17. In addition, it is provided with a guide region 29 which can slide with its guide webs 30 in the longitudinal guide grooves 25 in the longitudinal direction. The guide webs 30 can extend over from about 20 to 80 percent of the total length of the female part 18 and preferably have a length of from about 40 to 60 percent of the total length of the female part 18. The radial extension of the guide webs 30 can be from about 20 percent to 100 percent of the thickness of the material of the tubular material of the inner part 18 in its section remote from part 17 and the radial extension is preferably from about 40 to 60 percent. Finally, it is provided in its outer region with an axial cylindrical bore 31 which corresponds to the bore 22. The outer part 17 and the inner part 18 together form a slide connection which is slidable in axial direction and is rigid in the rotary direction. The helical spring 19 is tensioned between the narrowing 23 and of the outer part 17 and a stop edge 33 of the inner part 18, which is placed onto the extension 28. This partially compressed spring attempts to press the two parts 17 and 18 away from each other.

Springing and injection molded support hooks 35 are applied at the extension 28 of the inner part 18. The outer diameter of the extension 28 can be from about 80 to 99 percent of the inner diameter of the inner collar and preferably is from about 95 to 98 percent of the inner diameter of the inner collar 23. The inner part 18 is snapped together with the outer part 17 in disengageable fashion. The barb hook like back edges of the support hooks 35, together with the narrowing inner collar 23, form a first stop for limiting the path of the spring. The support hooks can protrude radially by an amount corresponding to from about 20 to 80 percent of the radial thickness of the inner collar 23. Preferably the outer front edge of the support hooks is bevelled and/or the inner front edge of the inner collar 23 is bevelled. A second stop is formed by the edge 36 of the inner part 18 together with the inner front face 26 of the outer part 17. The stop 36 can be generated by having the outer diameter of the guide region about equal to the inner diameter of the outer region of the inner part 18 plus minus half the thickness of the tubular material of the inner part in its section remote from the part 17. Preferably, the outer diameter of the guide region can be about equal to the inner diameter of the section remote from part 17 plus minus 20 percent of the material thickness of the respective remote section. In general, the thickness of the tubular material is from about 10 to 70 percent of the tube part diameter and preferably is from about 30 to 50 percent of the tube part diameter.

In each case a metallic dog driver bolt 44, or, respectively, 45 is attached to the outer front faces 40 or, respectively 41 of outer part and of the inner part, where the bolt is directed crosswise in each case to the bore 22 or, respectively, 31. The outer part 17 can be reinforced near its end by an outer collar 61 which provides a face 40 larger than the general thickness of the tubular material of part 17. The outer collar 61 can have an extension in the direction of the tubular axis which is about half to five times the diameter of the material of the tubular part 17 and which is preferably from about 1.5 to 3 times the thickness of the material of the tubular part 17. A similar collar can be provided at the outer end of the inner tubular part 18. These collars provide a reinforcement of the material which allows to provide better support the dog drive pins or bolts.

The bores 44, 45 correspond in their length to the outer diameter of the outer part (17) or, respectively, the inner part 18. The bolts are thicker at their inner region, which corresponds to the diameter of the axial bores 31 or, respectively, 22, as compared to their outer ends. The bolts are snapped in with these outer ends from the side of the front faces 40, 41 of the parts 17, 18 into sack-like inwardly expanding and radially oppositely disposed slots in the wall of the parts 17, 18. Based on the construction described, the mounting and assembly of the dog driver bolts 44, 45 is very simple, and they are held not disengageable and rigid in their longitudinal direction, as well as crosswise to their longitudinal direction. The relative thickening of the dog driveable bolts 44, 45 in their middle regions can thus be easily produced by cutting the bolts from round stock and machining them down to some extent at the outer ends.

It is possible in principle that the bolts 44, and 45 as shown are staggered with respect to each other by 90 degrees or that they are disposed in parallel. In the latter case, generally a more uniform motion results.

The driving and the driven shafts 11, 12 are provided at their front faces with ball or barrel shaped joint heads 48 or, respectively, 49. The shafts can be placed into the axial bores 31 or, respectively, 22 based on the joint heads. Each of the joint heads is provided with a slot like groove 52 or, respectively, 53 which is open on one side. The bottoms of the grooves are provided in the two cases at each time with a centered protrusion 56 or, respectively, 57.

The dog driver bolts 44, 45 are tuned in their diameter to the width of the grooves 53, 52 into which they are inserted and placed.

The dog driver bolts 44, 45, the grooves 52, 53, the joint heads 48, 49 and the axial bores 31, 22 together form two Cardan joints. These joints are sometimes also called Hooke joints. The helical spring 19 continuously presses the outer part 17 and the inner part 18 apart from each other and takes care that the dog driver bolts 44, 45 are contracting continuously under pressure the protrusions 57 or, respectively, 56 of the groove floor. The helical spring 19 can have an operational length of from about one twentieth of the length of the outer part 17 to about 70 percent of the length of the outer part and preferably from about one tenth of the length of the outer part 17 to about forty percent of the length of the outer part 17.

The not disengageable connected inner and outer parts 18 and 17, as well as the spring 19 form together a device unit which represents a springing, sliding connection caused by spring 19 and which comprises parts of two Cardan joints. These parts are dog driveable bolts 44, 45 as well as axial bores 31, 22 which effect a sideward guiding of the joints.

The joint heads 48, 49 and their slot grooves 52, 53 serve to complete the joints. A great advantage of this separation is that the intermediate shaft 15 has only to be stuck onto the slotted shaft ends, which can be accomplished without tools, in order to achieve the connection of the driver shaft 11 and the driven shaft 12 in a pressed together state after they have been mounted. Vice versa, naturally demounting is at any time possible in a simple fashion.

Some possible variations in the embodiments of the invention device are indicated in the following:

The outer part 17 and the inner part 18 can be manufactured from plastic by injection molding as set forth above, however, they can also be made in a different fashion from other materials such as metal.

The joint heads 48, 49 can be in their diameter larger, equal or smaller than the diameter of the coordinated shafts 11, 12. They can be milled and cut from shafts 11, 12, or they can be connected rigidly to the shafts as separate parts.

The centered protrusions 56, 57 at the floors of the grooves 52, 53 can be formed like a wedge as shown, or they can be like the tips of arrows with concave flanks, for example by a milling cutter which is guided crosswise to the shaft axis. The protrusions, however, can also be formed by bearing chips inserted into the grooves 52, 53.

The helical spring 19 can be replaced by another suitable elastic and springing part. In addition, the helical spring 19 can be disposed outside of the intermediate shaft 15 instead of inside. For example, it can be tensioned between the front face 26 of the outer part 17 and the collar 59 of the inner part 18.

Support hooks 35 can be disposed at a different location, for example at the longitudinal guide grooves 25.

It will be understood that each of the elements described above, or two or more together, may also find a useful application in other types of mechanical coupling system configurations and rotation transfer procedures differing from the types described above.

While the invention has been illustrated and described as embodied in the context of a device for providing a force transmitting connection between two rotating shafts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A universal joint coupling device for the accomodation of misalignment comprising
    a drive shaft have a ball-shaped joint head rigidly attached thereto at one end thereof;
    a driven shaft having a ball-shaped joint head rigidly attached thereto at one end thereof;
    each ball-shaped joint head having a dog driver slot extending radially therethrough and formed as a groove open to the outer end of said ball-shaped joint head, the bootom of each said groove having a centered protrusion;
    an intermediate shaft disposed between said drive and driven shafts, said intermediate shaft comprising an outer tubular part having first and second ends and an inner part having first and second ends, said inner part first end being telescopically received in torque transmitting engagement in said outer tubular part first end, each of said outer tubular part and said inner part having an axial cylindrical bore at said second end, respectively receiving one of said ball-shaped joint heads of said drive and driven shafts; and
    a first dog driver bolt anchored to said second end of said outer tubular part; and
    a second dog driver bolt anchored to said second end of said inner part, said first dog driver bolt having a length which corresponds to the outer diameter of said outer tubular part and said second dog driver bolt having a length which corresponds to the outer diameter of said inner part, each dog driver bolt having a thickened middle region received in each said dog driver slot which corresponds in length to the respective diameter of said axial cylindrical bores;
    said outer tubular part including a radially inwardly extending collar section intermediate the ends thereof;
    said inner part including an extension axially extending from said inner part first end and terminating in barbed spring support levers which are snapped past said collar section and limit axial separation of said outer tubular part and said inner part;
    said intermediate shaft further including a helical spring interposed between said collar section and said inner part first end to bias said outer tubular part and said inner part in opposite directions to thereby bring the dog driver bolts into continuous close engagement with said centered protrusions.

2. The device according to claim 1 wherein the outer tubular part and the inner part in each case are injection molded plastic elements.

3. The device according to claim 1 wherein
    the ball-shaped joint head of the drive shaft and the dog driver slot disposed therethrough form an integrated part of the driving shaft and wherein the ball-shaped joint head of the driven shaft and the dog driver slot disposed therethrough form an integrated part of the driven shaft.

4. The device according to claim 1 wherein the respective ball-shaped joint heads and the respective dog driver slots disposed therethrough are provided as self-contained elements, which are rigidly connected to the drive and driver shafts respectively.

5. The device according to claim 1 wherein the outer diameter of the extension of the inner part has a diameter of a size of about the diameter of the axial cylindrical bore of the inner part plus minus 20 percent of the thickness of the wall of the inner part.

6. The device according to claim 1 wherein the inner part and the outer tubular part are provided with a outer reinforcing collar at their respective second end.

7. The device according to claim 1 wherein the helical spring covers a longitudinal region of from about 10 to 40 percent of the total length of the outer part.

8. The device according to claim 1 wherein the extension of the inner part corresponds in its length to about 30 to 50 percent of the total length of the outer tubular part.

* * * * *